(12) United States Patent
Kondo et al.

(10) Patent No.: US 6,945,242 B2
(45) Date of Patent: Sep. 20, 2005

(54) CUTTING METHOD USING WIRE SAW, WIRE SAW DEVICE, AND METHOD OF MANUFACTURING RARE-EARTH MAGNET

(75) Inventors: Sadahiko Kondo, Takarazuka (JP); Akira Miyachi, Takatsuki (JP); Hazime Ishida, Takatsuki (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 10/492,681
(22) PCT Filed: Oct. 15, 2002
(86) PCT No.: PCT/JP02/10695
  § 371 (c)(1),
  (2), (4) Date: Apr. 15, 2004
(87) PCT Pub. No.: WO03/033207
  PCT Pub. Date: Apr. 24, 2003

(65) Prior Publication Data
US 2004/0255924 A1 Dec. 23, 2004

(30) Foreign Application Priority Data
Oct. 17, 2001 (JP) .................................. 2001-3118867
May 23, 2002 (JP) .................................. 2002-149678

(51) Int. Cl.⁷ .............................................. B28D 1/08
(52) U.S. Cl. ...................... 125/21; 83/651.1; 83/171; 83/16
(58) Field of Search .................... 125/21; 83/651.1, 83/171, 16; 29/607, 412

(56) References Cited

U.S. PATENT DOCUMENTS

| 4,005,044 A | 1/1977 | Raleigh |
| 4,770,723 A | 9/1988 | Sagawa et al. |
| 4,792,368 A | 12/1988 | Sagawa et al. |
| 5,013,482 A | 5/1991 | O'Neil |

(Continued)

FOREIGN PATENT DOCUMENTS

| JP | 04-218594 | 8/1992 |
| JP | 08-057847 | 3/1996 |
| JP | 09-029607 | 2/1997 |

(Continued)

OTHER PUBLICATIONS

U.S. Appl. No. 09/996,318, filed on Nov. 23, 2001, currently pending; for: "Method for Cutting Rare Earth Alloy, Method for Manufacturing Rare Earth Magnet, and Wire–Saw Machine"; Applicants: Sadahiko Kondo et al.

Primary Examiner—Joseph J. Hail, III
Assistant Examiner—Bryan Muller
(74) Attorney, Agent, or Firm—Keating & Bennett, LLP (57) ABSTRACT

A method of cutting a rare-earth alloy with a wire 20, on which abrasive grains are fixed with a resin layer provided on the outer surface of a core wire, includes the steps of: providing a wire, of which the surface is coated with a lubricant including a glycol, by reeling the wire up in a pair of reel bobbins 40a and 40b; reeling the wire off one of the reel bobbins and letting the wire travel on a plurality of rollers 10a, 10b and 10c; and cutting the rare-earth alloy with the traveling wire while a portion of the rare-earth alloy being cut with the wire is supplied with a first coolant which is mainly composed of water. As a result, the life of a wire can be extended when a rare-earth alloy is cut with a wire saw machine using a coolant which is mainly composed of water.

16 Claims, 5 Drawing Sheets

U.S. PATENT DOCUMENTS

| | | |
|---|---|---|
| 5,176,850 A | 1/1993 | O'Neil |
| 5,201,305 A | 4/1993 | Takeuchi |
| 5,827,113 A | 10/1998 | Okuno et al. |
| 5,896,851 A | 4/1999 | Katamachi et al. |
| 6,006,737 A | 12/1999 | Hayashi et al. |
| 6,381,830 B1 | 5/2002 | Chikuba et al. |
| 6,390,896 B1 | 5/2002 | Huber et al. |
| 6,443,143 B1 | 9/2002 | Ishida et al. |
| 6,471,583 B1 | 10/2002 | Kondo |

FOREIGN PATENT DOCUMENTS

| | | |
|---|---|---|
| JP | 09-314548 | 12/1997 |
| JP | 10-166353 | 6/1998 |
| JP | 10-277914 | 10/1998 |
| JP | 11-198018 | 7/1999 |
| JP | 11-198020 | 7/1999 |
| JP | 11-309661 | 11/1999 |
| JP | 2000-296455 | 10/2000 |
| JP | 2001-047363 | 2/2001 |
| JP | 2001-138205 | 5/2001 |
| JP | 2001-164240 | 6/2001 |
| JP | 2002-036113 | 2/2002 |
| JP | 2002-096251 | 4/2002 |

CUTTING METHOD USING WIRE SAW, WIRE SAW DEVICE, AND METHOD OF MANUFACTURING RARE-EARTH MAGNET

BACKGROUND OF THE INVENTION

The present invention relates to a method of cutting with a wire saw, a wire saw machine and a method for producing rare-earth magnets.

DESCRIPTION OF THE RELATED ART

A rare-earth alloy is used as a material to make a strong magnet. A rare-earth magnet, obtained by magnetizing a rare-earth alloy, can be used effectively as a magnet for a voice coil motor, which is used to position a magnetic head in a magnetic recorder, for example.

In the prior art, an ingot (or a sintered body) of a rare-earth alloy is often cut by a technique of slicing the ingot with a rotating slicing blade, for example. In this slicing blade cutting process, however, the cutting edge is relatively thick, thus requiring a lot of machining allowance. As a result, the yield of the rare-earth alloy material is so low as to increase the cost of resultant rare-earth alloy products (e.g., rare-earth magnets).

A wire cutting process is known as a cutting method that requires smaller machining allowance than the slicing blade cutting process does. For example, Japanese Laid-Open Publication No. 11-198020 discloses that a hard and brittle material such as silicon, sapphire, quartz, glass, neodymium or ferrite may be cut with a wire, which is obtained by fixing superabrasive grains on the outer surface of a high-hardness core wire with a bonding layer (which is sometimes called a "fixed abrasive wire").

If a number of plates with a predetermined thickness can be obtained at the same time by cutting a rare-earth alloy ingot with such a fixed abrasive wire with small machining allowance, then the manufacturing cost of rare-earth magnets can be reduced significantly. However, nobody has ever reported that a rare-earth alloy could be cut successfully with such a fixed abrasive wire at a mass-producible level.

The present inventors carried out extensive researches on this phenomenon and spotted the major cause of this problem in a significant difference in mechanical property between a rare-earth alloy produced by a sintering process (which will be referred to herein as a "rare-earth sintered alloy") and silicon, for example. More specifically, a rare-earth sintered alloy includes a hard main phase (R2Fe14B phase) that mainly causes brittle fracture and a grain boundary phase (R-rich phase) that causes ductile fracture. Accordingly, unlike a hard and brittle material such as silicon, the rare-earth sintered alloy is not so easy to cut. That is to say, compared with cutting silicon or any other hard and brittle material, higher cutting resistance is produced and a huge quantity of heat is generated, too. Also, the specific gravity of a rare-earth alloy is approximately 7.5, which is much higher than that of silicon or any other hard and brittle material. For that reason, cutting debris (or sludge), produced by the machining process, cannot be easily flushed away from the machined portion.

Thus, to cut a rare-earth alloy with high machining accuracy and efficiency, it is necessary to not only decrease the cutting resistance sufficiently but also efficiently dissipate the heat to be generated during the cutting process i.e., efficiently cool the machined portion). Furthermore, it is also necessary to efficiently flush away the cutting debris produced by the cutting process.

By supplying the rare-earth alloy machined portion with plenty of highly lubricant coolant (which will also be referred to herein as a "cutting fluid"), the cutting resistance can be decreased and the heat to be generated during the cutting process can be dissipated efficiently. The present inventors discovered and confirmed via experiments that if a wire is wet with a sufficient amount of an oil coolant, then the traveling wire can supply a narrow machined portion with plenty of that coolant.

When such an oil coolant is used, however, it takes a lot of costs to process its waste so as not to create any environmental damage and it is difficult to recycle the waste or cutting debris because the cutting debris is hard to sort out from the waste. Also, if the cutting debris of the rare-earth alloy is recycled, then the amount of carbon included in the material will increase to deteriorate the magnetic properties unintentionally. In view of these considerations, water (or an aqueous coolant) is preferably used as the coolant. However, if water is used as a coolant, then it is impossible to keep a sufficient amount of water deposited on the traveling wire because water has low viscosity (with a kinematic viscosity of 1.0 mm2/s). As a result, even if the wire was wet with water, a sufficient amount of water could not be supplied to the machined portion.

Japanese Laid-Open Publication No. 11-198020 discloses that by moving the wire through a coolant overflowing from a coolant vessel, the coolant can be kept deposited on the wire just as intended even in a situation where a fixed abrasive wire needs to travel at a high velocity (e.g., at 2,000 m/min). However, the present inventors discovered via experiments that even when a rare-earth alloy was cut with a wire traveling through such overflowing water (as disclosed in Japanese Laid-Open Publication No. 11-198020, for example), the abrasive grains still dropped or the wire snapped in a worst-case scenario. These inconveniences also happened even when the wire traveled at a velocity of about 800 m/min. This is believed to be because even if the above method is adopted, the cutting resistance is still high and water still cannot be supplied to the machined portion sufficiently.

As a result of various experiments, the present inventors discovered that the wire could be cooled efficiently by supplying the machined portion with a coolant mainly composed of water having a surface tension of 25 mN/m to 60 mN/m (or a kinetic friction coefficient of 0.1 to 0.3) at 25° C. (see Japanese Patent Applications Nos. 2000-358462 and 2001-318867). A coolant with a surface tension or a kinetic friction coefficient falling within the above range exhibits higher wettability (or conformability) with the rare-earth alloy and/or the wire than water. Thus, it is believed that the coolant can efficiently penetrate the machined portion (i.e., the region where the rare-earth alloy and the wire contact with each other and the rare-earth alloy is cut and which will also be referred to herein as a "cutting groove"). Naturally, the coolant mainly composed of water has higher specific heat, and therefore results in higher cooling efficiency, than an oil coolant (e.g., mineral oil). As used herein, the "coolant mainly composed of water" refers to a coolant, at least 70 wt % of which is water.

However, as a result of further researches, the present inventors discovered that when such a coolant mainly composed of water was used, the abrasive grains came off the wire at a reel bobbin, in which the wire was reeled up, due to some friction of contact between portions of the wire. Such a phenomenon will sometimes be referred to herein as "grain drop-off".

The present inventors discovered that this phenomenon occurred for the following reasons. Specifically, the coolant mainly composed of water shows lower adhesion to the wire, and higher vaporizability, than an oil coolant. Accordingly, when the wire is reeled up in the reel bobbin, almost no coolant is left on the wire if any, and therefore, cannot reduce the heat or mechanical friction generated due to the friction of contact between the wire portions. That is to say, this situation is probably brought about because the coolant should reach the wire in the machined portion but be scattered away on the way, i.e., by the time the wire is reeled up in the reel bobbin.

Furthermore, even if the abrasive grains do not come off the wire, the friction caused between those portions of the wire always does some mechanical damage on the abrasive grains, thus decreasing the cutting accuracy or cutting efficiency. In a worse situation, even the resin layer (i.e., the bonding layer) may peel off along with the abrasive grains. That is to say, if the coolant mainly composed of water is used, then friction will be caused between those portions of the wire at the reel bobbin, thus shortening the wire life. A fixed abrasive wire is relatively expensive. Accordingly, to cut down the cost for the cutting process, the life of the wire is preferably extended.

Furthermore, if a wire, on which the abrasive grains are bonded with a resin layer that has been deposited on the outer surface of a core, is used, then a "resin peeling phenomenon", i.e., peeling of the resin layer off the core, might occur. As a result of various researches, the present inventors discovered that this resin peeling phenomenon was brought about due to not only the damage done on the abrasive grains because of the friction of contact between the wire portions but also another damage done on the resin layer by the coolant mainly composed of water (e.g., a coolant including an amine such as an alkaline rust preventive among other things).

As described above, it is particularly difficult to cut a rare-earth alloy with a wire saw. However, the life of a wire is shortened by the use of such a coolant mainly composed of water not just in cutting a rare-earth alloy but also in cutting any other hard and brittle material such as silicon, sapphire, quartz, glass, neodymium or ferrite.

SUMMARY OF THE INVENTION

In order to overcome the problems described above, a primary object of the present invention is to extend the life of a wire when some workpiece is cut with a wire saw machine using a coolant mainly composed of water.

A cutting method according to the present invention is a method of cutting a workpiece with a wire, on which abrasive grains are fixed with a resin layer provided on the outer surface of a core wire. The method includes the steps of: providing a wire, of which the surface is coated with a lubricant including a glycol, by reeling the wire up in a reel bobbin; reeling the wire off the reel bobbin and letting the wire travel on a plurality of rollers; and cutting the workpiece (object being cut) with the traveling wire while a portion of the workpiece being machined with the wire is supplied with a first coolant which is mainly composed of water, thereby achieving the object described above. Among other things, the resin peeling problem can be avoided.

The method preferably further includes the step of supplying a second coolant, which is also mainly composed of water, to the wire that is either reeled up in the reel bobbin or traveling in the vicinity of the reel bobbin.

The second coolant preferably exhibits a kinetic friction coefficient of 0.3 or less at 25° C. with respect to a rare-earth alloy.

The second coolant may include glycol.

The second coolant may be supplied to the wire by an atomization method.

The providing step preferably includes reeling the wire up in the reel bobbin with a tension of 7 N to 15 N.

The wire is preferably reeled up in the reel bobbin at a pitch that is less than twice as long as the outside diameter of the wire, more preferably more than 100% to 190% of the outside diameter.

The first coolant preferably exhibits a kinetic friction coefficient of 0.1 to 0.3 at 25° C. with respect to the rare-earth alloy.

The resin is preferably a phenol resin, an epoxy resin or a polyimide resin.

In a direction in which the wire is traveling, an average distance between adjacent ones of the abrasive grains preferably falls within the range of 100% through 600% of the mean particle size of the abrasive grains and portions of the abrasive grains protruding from the surface of the resin layer preferably have an average height of 10 $\mu$m to 40 $\mu$m.

The second coolant preferably has higher viscosity than the first coolant.

The first and second coolants preferably have temperatures of 15° C. to 35° C.

Each of the plurality of rollers preferably includes a polymer layer on which a guide groove is provided, the guide groove preferably has a pair of sloped surfaces, at least one of which defines an angle of 25 degrees to less than 45 degrees with respect to a radial direction of the roller, and the wire is preferably passed between the sloped surfaces.

The workpiece may be made of an R—Fe—B based rare-earth sintered alloy. For example, the workpiece may be made of an Nd—Fe—B based rare-earth sintered alloy.

A method for producing rare-earth magnets according to the present invention includes the steps of; making a sintered body for the rare-earth magnets from a rare-earth alloy powder; and dividing the sintered body by one of the cutting methods described above into a plurality of rare-earth magnets. A wire saw machine according to the present invention includes: a wire, on which abrasive grains are fixed with a resin layer provided on the outer surface of a core wire; a reel bobbin, around which the wire is reeled up; a plurality of rollers, which reels the wire off the reel bobbin to let the wire travel thereon; a device for supplying a first coolant to a portion of a workpiece being cut with the wire; and a device for supplying a second coolant, including a glycol, to the wire that is either reeled up in the reel bobbin or traveling in the vicinity of the reel bobbin, thereby achieving the object described above.

The device for supplying the second coolant may include an atomizer.

Rare-earth magnets produced by the rare-earth magnet producing method of the present invention are preferably used in a voice coil motor.

DETAILED DESCRIPTION OF PREFERRED EMBODIMENTS

Hereinafter, a cutting method according to a preferred embodiment of the present invention will be described.

In a cutting process according to the present invention, a wire, obtained by fixing abrasive grains (which are typically diamond abrasive grains) on a core wire (which is typically a piano wire), is used. Such a wire will be referred to herein as a "fixed abrasive wire". The wire, which is reeled in a pair of reel bobbins, travels on a plurality of rollers, and a rare-earth alloy (workpiece) is pressed against, and cut with, the traveling wire. In this process step, the rare-earth alloy is cut while a portion of the rare-earth alloy being machined with the wire is supplied with a coolant mainly composed of water (first coolant). In this case, in the process step of providing the wire by reeling it in the reel bobbins, the surface of the wire is preferably coated with a lubricant including a glycol. Then, the resin layer will not peel off the wire, on which the abrasive grains are fixed with the resin layer provided on the outer surface of the core wire.

As the lubricant including a glycol, either a non-diluted glycol or an aqueous solution including at least 50 mass % of glycol is preferably used. For example, polyoxyalkylene is preferably used as the glycol. A glycol shows higher hydrophilicity (or water holding ability) than the resin layer and is believed to act so as to prevent the resin layer from absorbing water. Also, the lubricant including the glycol, supplied to the wire in the step of providing the wire by reeling it in the reel bobbins, preferably exhibits higher lubricity than the coolant supplied to the machined portion.

The process step of coating the surface of the wire with the lubricant including the glycol is preferably carried out while the wire is being reeled in the reel bobbins of the wire saw machine. As a method of supplying the glycol (or glycol aqueous solution) to the wire surface, a scattering method with a spray, a dripping method, a coating method or an immersing method may be appropriately adopted. The wire is preferably reeled in the reel bobbins with a tension of 7 N to 15 N. The reasons are as follows. Specifically, if the tension was lower than 7 N, then the wire might get entangled. However, if the tension exceeded 15 N, then some damage could be easily done due to friction between portions of the wire themselves. Also, the tension is preferably set within this range because good cutting accuracy is achieved in that case.

The pitch at which the wire is reeled in the reel bobbins (i.e., the distance between the centers of adjacent wire portions) is preferably less than twice as long as the outside diameter of the wire and more preferably greater than 100% but equal to or smaller than 190% of the outside diameter. By adjusting the reeling pitch in this manner, it is possible to prevent a newly incoming portion of the wire from getting entangled with the wire portions that have already been reeled in the reel bobbins. As a result, the flexure of the wire and the friction between the wire portions can be minimized.

In this manner, if the wire is coated with the lubricant including the glycol while the wire is reeled in the reel bobbins in the providing process step of the wire saw machine, then the deterioration of the resin layer of the wire, which would otherwise be caused due to the absorption of moisture into the wire during storage, can be minimized. The lubricant including the glycol may be supplied to the wire not just in that providing process step. For example, a glycol may also be added to or mixed with a second coolant.

To extend the life of the wire, either those wire portions reeled in the pair of reel bobbins or the wire portions traveling in the vicinity of the pair of reel bobbins are preferably further supplied with a coolant mainly composed of water (i.e., a second coolant). By additionally supplying the coolant to the wire portions that are reeled in the reel bobbins, the quantity of heat or mechanical friction created due to the contact of those wire portions at the reel bobbins can be reduced. As a result, the mechanical damage to be done on the wire can be reduced, and therefore, the decrease in cutting accuracy or efficiency can be minimized and the life of the wire can be extended.

The first coolant preferably exhibits a kinetic friction coefficient of 0.1 to 0.3 at 25° C. with respect to the rare-earth alloy. The second coolant also preferably exhibits a kinetic friction coefficient of 0.3 or less (more preferably 0.15 or less) at 25° C. with respect to the rare-earth alloy. It should be noted that the kinetic friction coefficients specified for the following preferred embodiment were obtained by testing an R—Fe—B based rare-earth alloy sintered body with a four-ball friction tester. The composition and manufacturing process of a rare-earth alloy that can be used effectively to make an R—Fe—B based rare-earth magnet are described in U.S. Pat. Nos. 4,770,723 and 4,792,368, for example.

In this example, the first and second coolants for use in a cutting process according to the present invention are specified by their kinetic friction coefficients at 25° C. However, the temperature of the coolants actually used does not have to be 25° C. Nevertheless, to achieve the effects of the present invention, coolants of which the temperatures are controlled to the range of 15° C. to 35° C. are preferably used. The coolant temperatures more preferably fall within the range of 20° C. to 30° C. As is well known, the kinetic friction coefficient of a coolant depends on the temperature. Accordingly, if the temperatures of the coolants actually used are way out of these temperature ranges, then the kinetic friction coefficients of the coolants will practically fall out of their preferred ranges. As a result, the cooling efficiency decreases.

By using the coolants with these kinetic friction coefficients, the abnormal increase in the temperature of the wire can be minimized effectively. Accordingly, the unwanted abrasive grain drop-off and wire snapping can be minimized, or even eliminated, effectively. As a result, the decrease in machining accuracy can be avoided and the wire can be used for a longer time than the prior art. Consequently, the manufacturing cost can be cut down.

These effects are equally achieved by not only the first coolant being supplied to the machined portion but also the second coolant being supplied to the wire portions reeled up in the reel bobbins or traveling in the vicinity of the pair of reel bobbins. For that reason, the first and second coolants may be the same coolant. Alternatively, the second coolant may have higher viscosity than the first coolant so as to easily deposit on the wire portions reeled up in the reel bobbins or traveling in the vicinity of the reel bobbins. As the first and second coolants, coolants having viscosities of 1 mPa·s to 50 mPa·s (or kinematic viscosities of 1 mm2/s to 50 mm2/s) are preferably used. To make the second coolant deposit on the wire more easily, a coolant with a viscosity of at least 5 mPa·s (i.e., with a kinematic viscosity of at least 5 mm2/s) is preferably used. The viscosity of the coolant can be adjusted by controlling the concentration of the lubricant to be mixed with water as will be described later.

The second coolant does not have to be supplied through the cutting process. Instead, as long as the wire reeled up in the reel bobbins can be kept supplied with a good quantity of that coolant, the second coolant may also be supplied intermittently. It should be noted that the coolant mainly composed of water (e.g., a coolant including alkanolamine among other things) affects the resin more seriously than an oil coolant. For that reason, in using such a wire obtained by fixing abrasive grains thereon with a resin layer, the amount of the coolant supplied is preferably small. Accordingly, the wire portions that are either reeled up in the reel bobbins or traveling in the vicinity of the reel bobbins are preferably supplied with the coolant by an atomization method or a dripping method. Among other things, the spray method is preferred because a small amount of coolant can be uniformly supplied to the wire portions that are reeled up in the reel bobbins. The amount of the coolant to be supplied may be appropriately determined by the type, length and traveling velocity of the wire. For example, the coolant may be supplied at a rate of 50 ml/min to 500 ml/min. However, if an electroplated wire (i.e., a wire obtained by fixing abrasive grains thereon with an Ni plating layer, for example) or any other wire exhibiting high resistance to the aqueous coolant is used, then the overall reel bobbins may be immersed in the coolant.

The coolant may be prepared by adding either a surfactant or a synthetic lubricant (i.e., a so-called "synthetic") to water. A predetermined kinetic friction coefficient is achievable by changing the type or the amount of the additive appropriately. In addition, if such a coolant mainly composed of water is used, then the cutting debris of the rare-earth alloy can be easily sorted out of the cutting-created sludge with a magnet and the coolant can be recycled because the coolant has a relatively low viscosity. It is also possible to prevent the coolant waste disposal process from having harmful effects on natural environments. Furthermore, the amount of carbon included in the sludge can be reduced. As a result, the magnet to be made of the cutting debris collected from the sludge can have improved magnetic properties.

If the workpiece is cut with a wire traveling at a high velocity, then the coolant may foam to decrease the cooling efficiency unintentionally. However, by using a coolant including an antifoaming agent, such decrease in cooling efficiency due to foaming of the coolant can be minimized. Furthermore, when a coolant with a PH of 8 to 11 is used, the corrosion of the rare-earth alloy can be minimized. Moreover, by using a coolant including a rust preventive, the oxidation of the rare-earth alloy can be reduced significantly. The amounts of these additives may be appropriately adjusted with the type and cutting conditions of the rare-earth alloy and other factors taken into account.

A wire, on which diamond abrasive grains are fixed with a resin, is preferably used as the wire. More specifically, a wire, obtained by fixing diamond abrasive grains on the outer surface of a core wire (which is typically a piano wire) with a resin, is preferably used. Among other things, a phenol resin, an epoxy resin and a polyimide resin are particularly preferred. The reasons are as follows. First, these resins show not only high bond strengths with respect to the outer surface of the piano wire (i.e., hard-drawn wire) but also excellent wettability (i.e., permeability) with respect to the coolant as will be described later. Secondly, such wires are less expensive than wires to be produced by an electrodeposition process, thus reducing the cost of cutting a rare-earth alloy. It should be noted that the core wire of the wire does not have to be a piano wire but may also be made of an Ni—Cr alloy, an Fe—Ni alloy or any other suitable alloy, W, Mo or any other suitable refractory metal, or a bundle of high-strength fibers such as nylon fibers. Also, the material of the abrasive grains is not limited to diamond, either, but may be SiC, B, C or CBN (cubic boron nitride), for example.

To achieve the effect of small machining allowance, the wire preferably has an outside diameter of 0.3 mm or less, more preferably 0.25 mm or less. The lower limit of the wire outside diameter is defined so as to achieve sufficient strength. In addition, to fix abrasive grains of a predetermined size with sufficient strength, a core wire with a diameter of about 0.12 mm to about 0.20 mm is used. In view of the cutting efficiency, the mean particle size D of the abrasive grains preferably satisfies $20 \ \mu m \geq D \geq 60 \ \mu m$ and more preferably satisfies $40 \ \mu m \geq D \geq 60 \ \mu m$. Also, considering the cutting efficiency and the cutting debris (sludge) flushing efficiency, the average distance between two adjacent abrasive grains in the wire traveling direction is preferably 100% to 600% of the mean particle size D of the abrasive grains. Also, the average height of the portions of the abrasive grains protruding from the surface of the phenol resin layer is preferably within the range of $10 \ \mu m$ to $40 \ \mu m$. Such a wire is readily available from any common wire manufacturer (e.g., Allied Material Corp.) as long as these specifications are worked out in advance.

By using such a wire, good cutting efficiency and debris flushing capability are achieved. Thus, a workpiece can be machined even if the wire is allowed to travel at a relatively high velocity (e.g., at 1,000 m/min). In addition, since the rare-earth alloy can be cooled efficiently with the coolant described above, the rare-earth alloy can be constantly machined for a long time with good machining accuracy. When the coolant mainly composed of water is used, the cutting efficiency can be optimized by setting the traveling velocity about 20–30% higher (e.g., in the range of 1,100 m/min to 1,200 m/min) than the situation where an oil coolant is used.

The coolant mainly composed of water for use in the cutting method of the present invention has low viscosity (with a kinematic viscosity of about 1 mm2/s). Accordingly, the resultant cutting debris flushing capability is lower than that achieved by an oil coolant (which usually has a kinematic viscosity of 5 mm2/s or more). Thus, in order to increase the cutting debris flushing capability, the machined portion is preferably kept immersed in the coolant stored in the vessel in the cutting process. In addition, the coolant is preferably supplied into the vessel not only through its bottom but also from its opening such that the coolant is always overflowing from the opening of the vessel.

The cutting debris, which has been flushed into the low-viscosity coolant, easily precipitates and just a small amount of cutting debris is floating around the opening of the vessel. To cut the workpiece with the machined portion immersed in the coolant, the wire needs to be arranged so as to travel through the coolant in the vicinity of the opening of the vessel. Accordingly, the wire travels in the coolant including little cutting debris, and the machined portion is supplied with the coolant including little cutting debris. In particular, if the coolant is also supplied from the vessel opening so as to be always overflowing from the opening, the coolant supplied to the machined portion can have a decreased amount of cutting debris. Furthermore, the cutting debris that has been deposited on the wire can also be washed away mechanically with the flow of the coolant supplied from the vessel opening. The quantity of the coolant overflowing per minute is preferably 50% or more of the volume of the vessel. Also, the amount of the coolant supplied from the opening is preferably greater than that of the coolant supplied through the bottom of the vessel.

Furthermore, if a curtain-like flow of the coolant (or the air) is formed around the vessel opening and if the surface of the overflowing coolant is kept higher than the vessel walls by reducing the amount of the coolant overflowing from the vessel opening, then an even greater quantity of coolant is supplied to around the machined portion. As a result, the amount of the cutting debris in the coolant can be further decreased. In this preferred embodiment, a curtain-like coolant flow is formed over the four sides of the vessel opening intersecting with the wire traveling direction. A discharge pressure to form the coolant flow is preferably in the range of 0.2 MPa (i.e., 2 kg/cm2) to 1.0 MPa (i.e., 10 kg/cm2), more preferably in the range of 0.4 MPa (i.e., 4 kg/cm2) to 0.6 MPa (i.e., 6 kg/cm2). The reasons are as follows. Specifically, if the discharge pressure is lower than these ranges, sufficient effects may not be achieved. However, if the discharge pressure exceeds these ranges, then the wire flexes so much that the machining accuracy may decrease.

Also, among a plurality of main rollers provided to make the wire travel thereon, two main rollers, arranged on both sides of the vessel to regulate the traveling path of the wire, are also preferably supplied with a coolant discharged. By discharging the coolant to these main rollers, the increase in the temperature of an organic polymer layer (e.g., a urethane rubber layer), which is provided on the surface of the main rollers so as to have a wire guide groove, can be minimized. In addition, the cutting debris (or sludge) that has been deposited or left either on the wire or in the guide groove can also be washed away, thereby preventing the wire traveling path from deviating or the wire from derailing from the groove.

Also, by collecting a dirty liquid, including the sludge with the rare-earth alloy cutting debris produced by the cutting process and the coolants, and by getting the rare-earth alloy cutting debris sorted out from the sludge by a magnet, the coolants- can be recycled (e.g., used cyclically). As described above, since the coolant mainly composed of water has low viscosity, the cutting debris can be easily sorted out therefrom. Also, by sorting out the rare-earth alloy cutting debris, the coolant waste can be disposed of easily without doing any damage on the environments. Furthermore, the cutting debris may also be used as a recycling material for a rare-earth alloy. The coolant for use in the cutting method of the present invention is mainly composed of water. Accordingly, it is easy to decrease the amount of carbon included in the rare-earth alloy that has been recycled from the cutting debris. Thus, a raw material that may be used as a material for a rare-earth magnet can be obtained. As a method of sorting out the cutting debris from the sludge, the method disclosed by the applicant of the present application in Japanese Patent Application No. 2000-224481 may be used.

As described above, the cutting method of the present invention can be used effectively to cut a rare-earth sintered alloy that is usually hard to machine, e.g., an R—Fe—B based rare-earth sintered alloy among other things. By magnetizing the rare-earth alloy that has been cut by the cutting method of the present invention, rare-earth magnets can be obtained. The magnetizing process may be carried out either before or after the cutting process. A rare-earth sintered magnet to be made from an R—Fe—B based rare-earth sintered alloy can be used effectively as a material for a voice coil motor for positioning a magnetic head. The cutting method of the present invention is preferably applicable for use in cutting an R—Fe—B based rare-earth sintered magnet (or alloy) as disclosed in U.S. Pat. Nos. 4,770,723 and 4,792,368, which were issued to the applicant of the present application. Among other things, the method of the present invention is particularly effectively applicable for use in cutting and making a rare-earth sintered magnet (or alloy), which contains neodymium (Nd), iron (Fe) and boron (B) as its main ingredients and includes a hard main phase (iron-rich phase) consisting of a tetragonal Nd2Fe14B intermetallic compound and an Nd-rich viscous grain boundary phase. Such a magnet (or alloy) will be referred to herein as a "neodymium magnet (or alloy)". Examples of typical neodymium magnets include NEOMAX produced by Sumitomo Special Metals Co., Ltd.

By adopting the cutting method of the present invention, a rare-earth alloy can be cut with high accuracy and efficiency. Thus, a small rare-earth magnet (with a thickness of 0.5 mm to 3.0 mm, for example) for use in a voice coil motor to position a magnetic head can be produced with high accuracy and efficiency.

In the preferred embodiment of the present invention described above, if the guide groove, provided on the polymer layer of the rollers to allow the wire to travel thereon, has two sloped surfaces, at least one of which defines an angle of 25 degrees to less than 45 degrees with respect to the radial direction of the rollers, and if the wire is passed between such sloped surfaces, then the wire breakage, which might otherwise occur when a coolant mainly composed of water is used, can be prevented. Naturally, both of the two sloped surfaces preferably define the angle of 25 degrees to less than 45 degrees with respect to the radial direction of the rollers. In particular, the wire traveling between the rollers preferably has a tension of 25 N to 35 N. It should be noted that the surface of the roller is a plane that is parallel to the axial direction of the roller.

EMBODIMENTS

Hereinafter, a cutting method according to a preferred embodiment of the present invention will be described in further detail with reference to the accompanying drawings. In the following preferred embodiment, a method of cutting a neodymium magnet sintered body to make the neodymium magnet mentioned above will be described.

A method for producing a neodymium (Nd—Fe—B) sintered magnet will be described briefly. It should be noted that a method of making a rare-earth alloy as a magnet material is disclosed in detail in the U.S. Pat. Nos. 4,770,723 and 4,792,368 identified above, for example.

First, material metals are exactly weighed to a predetermined mixture ratio and then melted in a high-frequency melting crucible within a vacuum or an argon gas atmosphere. The molten material metals are then poured into a water-cooled casting mold, thereby obtaining a material alloy with a predetermined composition. Then, this material alloy is pulverized to make a fine powder with a mean particle size of about 3 $\mu$m to about 4 $\mu$m. Subsequently, this fine powder is introduced into a die and then pressed and compacted under a magnetic field. If necessary, this compacting process step is carried out after the fine powder has been mixed with a lubricant. Next, the compact is subjected to a sintering process at a temperature of about 1,000° C. to about 1,200° C., thereby obtaining a neodymium magnet sintered body. Thereafter, to increase the coercivity of the magnet, the sintered body is further subjected to an aging treatment at about 600° C. to complete the manufacturing process of the rare-earth magnet sintered body. The sintered body may have dimensions of 30 mm×50 mm×50 mm, for example.

Then, the resultant sintered body is machined and cut, thereby dividing the sintered body into multiple thin plates (which will be sometimes referred to herein as "substrates" or "wafers"). Next, each of these thin plates of the sintered body is polished and finished to adjust its shape and dimensions. Subsequently, to improve the long-term reliability, the thin plate is further subjected to a surface treatment. Thereafter, the thin plate further goes through a magnetizing process and a testing process, thereby completing a neodymium permanent magnet. Alternatively, the magnetizing process may be carried out before the cutting process.

Hereinafter, a cutting process according to the present invention will be described with reference to FIGS. 1 through 4.

Figure 1:
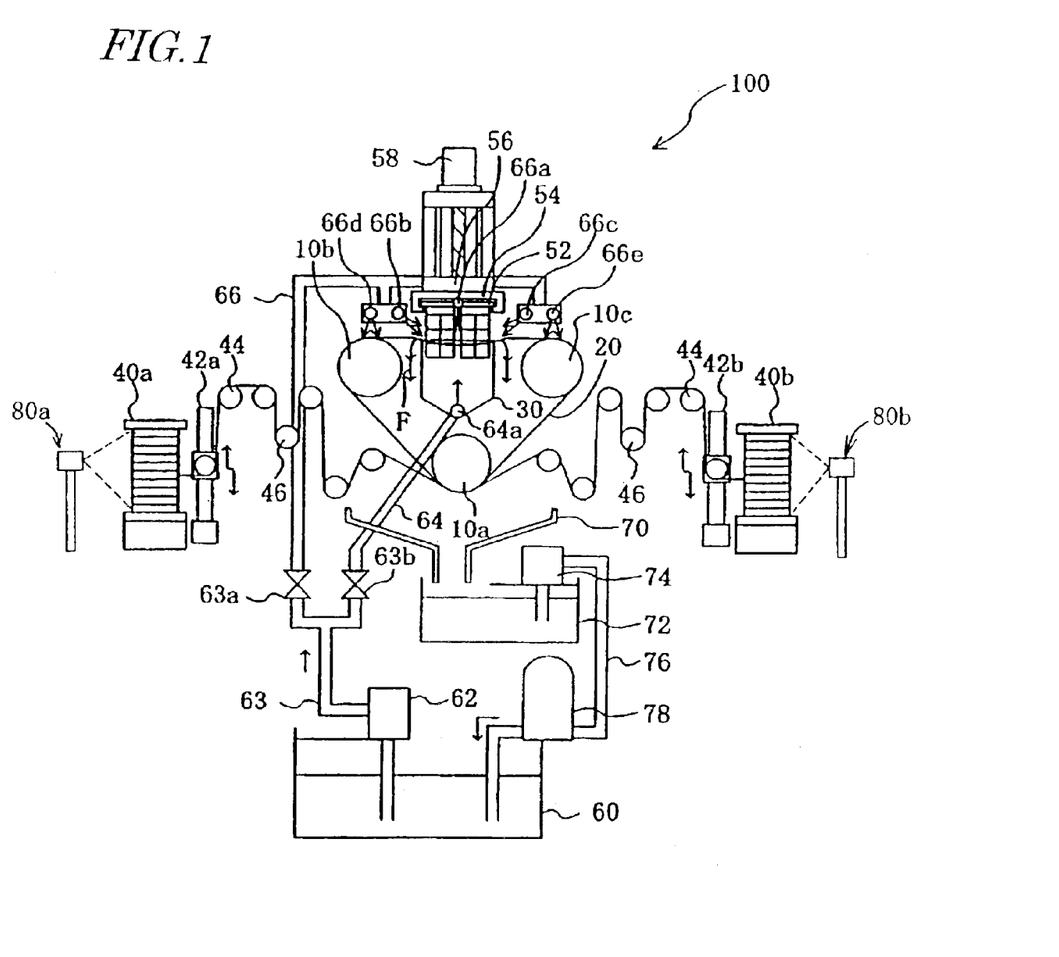
FIG. 1 is a schematic representation illustrating a wire saw machine 100, which can be used effectively to carry out a cutting method according to a preferred embodiment of the present invention.

FIG. 1 is a schematic representation illustrating a wire saw machine 100, which can be used effectively to carry out a cutting process according to a preferred embodiment of the present invention.

The wire saw machine 100 includes three main rollers 10a, 10b and 10c and two reel bobbins 40a and 40b. The main roller 10a, provided under a vessel 30 containing a coolant, is the drive roller, while the other main rollers 10b and 10c, arranged on both sides of the vessel 30, are driven rollers. The wire 20 travels back and forth while being reeled off one of the two reel bobbins (e.g., 40a) and reeled up in the other reel bobbin (e.g., 40b). In this case, if the reeling time of the reel bobbin 40a is set longer than that of the other reel bobbin 40b, then a brand new wire 20 can be fed to the reel bobbin 40a while allowing the wire 20 to move back and forth. The wire 20 preferably travels at a velocity of 200 m/min to 1,500 m/min. And the new wire may be fed at a rate of 0 m/min to 5 m/min, for example.

The wire 20 may be strung in 150 lines, for example, between the main rollers 10a, 10b and 10c. To define the traveling path of the wire 20, an organic polymer layer (e.g., an urethane rubber layer) with a guide groove (having a depth of about 0.6 mm, for example, and not shown) for guiding the wire 20 is provided on the surface of the main rollers 10a, 10b and 10c. The line-to-line spacing of the wire 20 is defined by the pitch of this guide groove. And the guide groove pitch is adjusted according to the thickness of plates to be cut out from the workpiece.

Traversers 42a and 42b for adjusting the reeling positions are provided in the vicinity of the reel bobbins 40a and 40b, respectively. Along the path leading from the reel bobbin 40a or 40b to the main roller 10a, five guide rollers 44 and one tension roller 46 are provided on each side, thereby guiding the wire 20 and regulating its tension. The tension of the wire 20 may be appropriately changed according to a combination of various conditions including cut length, cutting speed and traveling velocity. For example, the wire 20 may have a tension of 20 N to 40 N.

It should be noted that the damage to be done on the wire 20 due to the friction of contact between the wire portions that have been reeled up in the reel bobbin 40a or 40b also changes with the tension of the wire 20. For that reason, some mechanism for reducing the tension of the wire being reeled up in the reel bobbin 40a or 40b is preferably provided. As such a reeling tension reducing mechanism, the mechanism described in Japanese Laid-Open Publication No. 9-29607, No. 9-314548, No. 10-166353 or No. 10-277914 may be used. The reel bobbins 40a and 40b preferably have a reeling tension of 7 N to 15 N.

The wire saw machine 100 further includes atomizers 80a and 80b for supplying a coolant to portions of the wire 20 that have been reeled up in the reel bobbins 40a and 40b, respectively. In this preferred embodiment, the wire 20 on which abrasive grains are fixed with a resin is used. For that reason, an atomization method is adopted so as to supply a small amount of coolant to the wire 20 efficiently.

Figure 2:
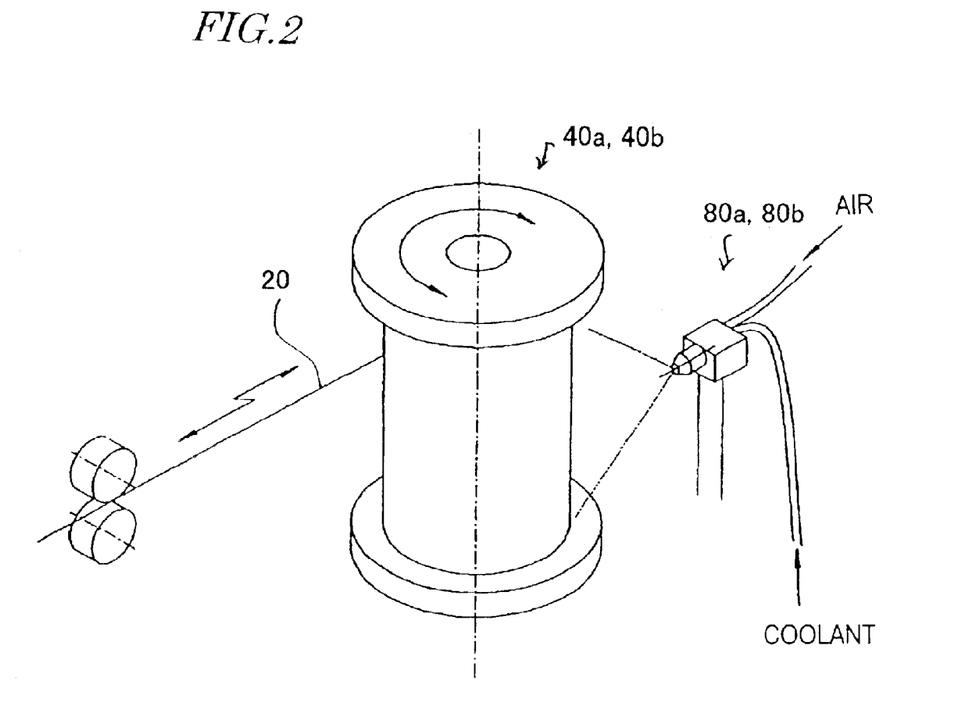
FIG. 2 schematically illustrates a structure for supplying a coolant to the wire 20 that is reeled up in the reel bobbin 40a or 40b of the wire saw machine 100.

As shown in FIG. 2, in each of these atomizers 80a and 80b, a coolant (e.g., at 200 ml/min) and the air (e.g., at 0.4 MPa) are supplied to a spray nozzle. The coolant used may be the same as the coolant tank 60 to be supplied to the machined portion as will be described later. The coolant may be sprayed against the overall wire 20 that has been reeled up in the reel bobbin 40a or 40b (with a core outside diameter of 170 mm and a height of 340 mm, for example). In this example, the coolant stored in the coolant tank 60 (to be described later) is also used as the coolant to be supplied to the wire 20 and is pumped by a discharge pump into the atomizers 80a and 80b by way of piping. It is naturally possible to provide another coolant tank for supplying a coolant to the atomizers 80a and 80b and use a different coolant from that supplied to the machined portion.

Optionally, to decrease the damage to be done on the wire 20 by the coolant and/or the amount of the coolant to be used, the area to be sprayed with the coolant may be limited. For example, an alternative mechanism may be designed such that a reel up (and reel off) operation is carried out synchronously with the operation of the traversers 42a and 42b shown in FIG. 1 and that the coolant is selectively supplied to only the area where friction is being produced between portions of the wire 20. Particularly where the wire 20 is allowed to move back and forth as in the illustrated embodiment, strong friction is produced between portions of the wire 20 that are reeled up in the reel bobbin 40a or 40b when the traveling direction is reversed. For that reason, the coolant is preferably supplied to this area at least.

The coolant supplying means is not limited to the atomizers 80a and 80b shown in FIG. 1 but may also be drippers, for example. In supplying a relatively large amount of coolant, a collecting pan for collecting and recycling an excessive coolant is preferably provided under the reel bobbin 40a or 40b if necessary. A filter and/or a magnet separator are/is preferably provided along the coolant collecting path so as to sort out and remove cutting debris from the coolant collected.

In the preferred embodiment described above, the coolant is sprayed against the portions of the wire 20 that have been reeled up in the reel bobbins 40a and 40b. Alternatively, the coolant may also be supplied to another portion of the wire 20, which is about to be reeled up in the reel bobbin 40a or 40b or which has just been reeled off the reel bobbin 40a or 40b. The damage to be done on the abrasive grains can be decreased if at least one of two adjacent portions of the wire is wet. Also, by supplying the coolant to that portion of the wire 20 that has just been reeled off the reel bobbin 40a or 40b, the damage to be caused on the wire 20 due to contact with the guide grooves of the guide rollers 44, tension rollers 46 and main rollers 10a, 10b and 10c can also be reduced.

The sintered body workpieces 50 obtained as described above are set into this wire saw machine 100 in the following manner.

A number of workpieces 50 are bonded together with an epoxy or hot-melt adhesive (not shown), for example. After these workpieces 50 have been assembled into a plurality of blocks, these blocks are fixed onto a ferrous work plate 54 with carbon base plates 52 interposed between them. The work plate 54, blocks of workpieces 50 and carbon base plates 52 are also bonded together with an adhesive (not shown). The carbon base plate 52 is subjected to the machining by the wire 20 after the workpieces 50 have been cut and until the work plate 54 stops descending. In this manner, the carbon base plates 52 function as a dummy for protecting the work plate 54.

In this preferred embodiment, each block is designed so as to have a size of about 100 mm as measured in the direction in which the wire 20 travels. Accordingly, in this example, the cut length to be achieved by the wire 20 is about 200 mm. In this preferred embodiment, the workpieces 50 are arranged as a plurality of blocks as described above. However, the size to be defined in the traveling direction of the wire 20 is also changeable with the kinetic friction coefficient of the coolant or the traveling velocity. Also, the number and arrangement of workpieces 50 that makes up a single block change with the size of each workpiece 50. Accordingly, the workpieces 50 may be appropriately arranged as blocks of the best size in view of these considerations.

The workpieces 50, which have been set in this manner, are lowered by an elevator with a motor 58 and pressed against the traveling wire 20 so as to be cut and machined. The lowering velocity of the workpieces 50 is changeable with various conditions but may be within the range of 20 mm/hr to 50 mm/hr, for example.

The coolant stored in the coolant tank 60 is pumped up by a discharge pump 62 and transferred by way of the piping 63. The piping 63 branches into a lower pipe 64 and an upper pipe 66, which are provided with valves 63b and 63a, respectively, to control the flow rate of the coolant. The lower pipe 64 is connected to a lower nozzle 64a, which is provided at the bottom of the vessel 30 in order to immerse the machined portion in the coolant. On the other hand, the upper pipe 66 is connected to not only upper nozzles 66a, 66b and 66c for supplying the coolant from the opening of the vessel 30 but also two more upper nozzles 66d and 66e provided for the purpose of cooling the main rollers 10b and 10c, respectively.

The coolant is supplied into the vessel 30 through the upper nozzles 66a, 66b and 66c and lower nozzle 64a. At least during the cutting process, the coolant is kept overflowing from the opening of the vessel 30 as indicated by the arrow F in FIG. 1. The coolant that has overflowed from the vessel 30 is guided to, and accumulated in, a collecting tank 72 by way of the collecting pan 70 provided under the vessel 30. The collected coolant may be pumped up by a discharge pump 74 and returned to the coolant tank 60 by way of a circulating pipe 76 as shown in FIG. 1, for example. A filter 78 is provided at a midway point of the circulating pipe 76 so as to sort out and remove the cutting debris from the coolant collected. However, the collecting method is not limited to the illustrated one. Alternatively, a mechanism for sorting out the cutting debris by magnetic force may be provided (see Japanese Patent Application No. 2000-224481, for example).

Figure 3:
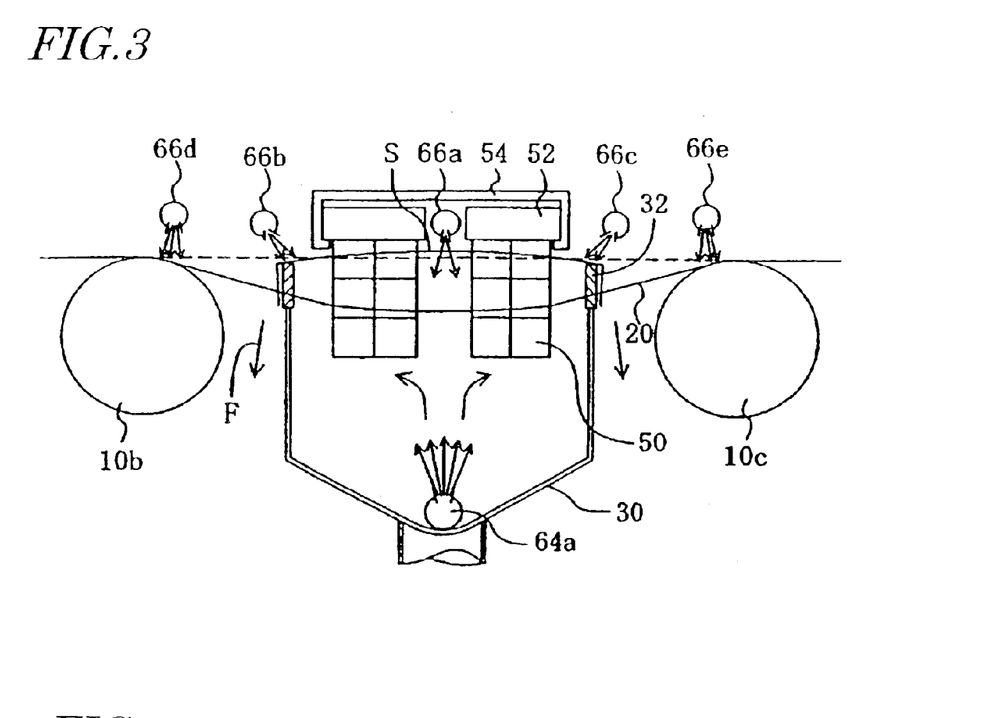
FIG. 3 is a schematic representation illustrating a configuration for the wire saw machine 100 shown in FIG. 1 in the vicinity of the machined portion.

Hereinafter, a cutting process according to the present invention will be described in further detail with reference to FIG. 3.

The vessel 30 includes a uxiliary walls 32 on its sidewalls, intersecting with the traveling direction of the wire 20, and in the vicinity of its opening. These auxiliary wails 32 may be plastic plates (e.g., acrylic plates) and are provided so as to be located near the traveling path of the non-loaded wire as indicated by the dashed line in FIG. 3. When the workpieces 50 are lowered and brought into contact with the wire 20 so as to be cut, the wire 20 flexes and the machined portions are immersed in th e coolant in th e vessel 30 as indicated by the solid curve in FIG. 3. In this case, as the wire 20 is bent downward, the wire 20 cuts off the auxiliary walls 32, thereby forming slits. When the cutting by the wire 20 reaches a steady state, the magnitude of the flexure becomes constant. As a result, the wire 20 is going to cut the workpieces 50 while passing the slits that have been created through the auxiliary walls 32. In this manner, the slits, formed through the auxiliary walls 32, function so as to regulate the traveling path of the wire 20 and contribute to stabilizing the machining accuracy.

The vessel 30 may have a capacity of about 35 I (litters). During the cutting process, the vessel 30 is supplied with the coolant at a flow rate of about 30 I/min through the lower nozzle 64a and at a flow rate of about 90 I/min through the upper nozzles 66a, 66b and 66c, respectively, such that the coolant is always overflowing from the opening. In order to supply the coolant to just the wire 20, it is not always necessary to make the coolant overflow because the wire 20 flexes during the cutting process as shown in FIG. 3. However, in cutting a neodymium magnet sintered body as in this example, such a configuration is preferably adopted to increase the cutting debris flushing capability.

To increase the cutting debris flushing capability, it is effective to reduce the amount of the cutting debris included in the coolant in the vicinity of the machined portions. To achieve sufficient flushing capability, the quantity of the coolant overflowing per minute is preferably 50% or more of the vessel volume. Furthermore, a greater quantity of fresh coolant is preferably supplied from the opening of the vessel 30 rather than through the bottom thereof. In this preferred embodiment, a low-viscosity coolant mainly composed of water is used. Accordingly, the cutting debris that has been flushed away into the coolant precipitates easily. For that reason, if a lot of coolant is supplied through the bottom of the vessel 30, the precipitated cutting debris may be floating around the machined portions unintentionally.

Also, to increase the percentage of the fresh coolant to be supplied from the opening to the wire 20 (i.e., cutting grooves), the quantity of the coolant supplied from over the traveling wire 20 is preferably increased. That is to say, by additionally supplying the coolant from the opening of the vessel 30 and keeping the coolant overflowing from the opening , the amount of the cutting debris included in the coolant being supplied to the machined portions can be reduced. Furthermore, the cutting debris that has been deposited on the wire 20 can also be washed away mechanically with the flow of the coolant supplied from the opening of the vessel 30.

Also, the auxiliary wall s 32 described above function as the sidewalls of the vessel 30 except for the slits that have been formed by the wire 20, and therefore, can contribute to keeping the surface S of the coolant high. Furthermore, if a curtain-like coolant flow is formed around the opening of the vessel 30 with the nozzles 66b and 66c so as to intersect with the traveling direction of the wire 20 and if the surface S of the overflowing coolant is kept higher than the auxiliary walls 32 of the vessel 30 by reducing the amount of the coolant overflowing from the opening of the vessel 30, then an even greater quantity of coolant is supplied to around the machined portions. As a result, the amount of the cutting debris in the coolant can be further decreased. A discharge pressure to form the coolant flow is preferably in the range of 0.2 MPa (i.e., 2 kg/cm2) to 1.0 MPa (i.e., 10 kg/cm2), more preferably in the range of 0.4 MPa (i.e., 4 kg/cm2) to 0.6 MPa (i.e., 6 kg/cm2). The reasons are as follows. Specifically, if the discharge pressure is lower than these ranges, sufficient effects may not be achieved. However, if the discharge pressure exceeds these ranges, then the wire 20 may flex so much that the machining accuracy may decrease.

Also, the two main rollers 10b and 10c, arranged on both sides of the vessel 30 to regulate the traveling path of the wire 20, are also preferably supplied with the coolant discharged. By discharging the coolant to these main rollers 10b and 10c, the increase in the temperature of an organic polymer layer (e.g., a urethane rubber layer), which is provided on the surface of the main rollers 10b and 10c so as to have a guide groove for the wire 20, can be minimized. In addition, the cutting debris (or sludge) that has been deposited or left either on the wire 20 or in the guide groove can also be washed away, thereby preventing the traveling path of the wire 20 from deviating or the wire 20 from derailing from the groove. Furthermore, the flushing capability is also improved. Examples of the surfactants to be added to the coolant mainly composed of water include anionic surfactants and nonionic surfactants. Preferred anionic surfactants include fatty acid derivatives including fatty acid soap and naphthenic acid soap, ester sulfates such as a long-chain alcohol ester sulfate and an oil sulfate (e.g., an animal or vegetable oil sulfate), and sulfonic acids such as petroleum sulfonates. Preferred nonionic surfactants include polyoxyethylenes such as polyoxyethylenealkylphenyl ether and polyoxyethylene mono fatty acid ester, polyhydric alcohols such as sorbitan mono fatty acid ester, and alkylol amides such as fatty acid diethanol amide. Specifically, by adding about 2 wt % of water to a chemical solution type JP-0497N (produced by Castrol Limited), the kinetic friction coefficient can be adjusted so as to fall within the predetermined range.

Also, examples of preferred synthetic lubricants include synthetic solution types, synthetic emulsion types and synthetic soluble types. Among other things, synthetic solution types are particularly preferred. More specifically, lubricants including a glycol, an alkanol amine and so on (e.g., #830 and #870 produced by Yushiro Chemical Industry Co., Ltd.) or Syntairo 9954 (produced by Castrol Limited) may be used. In any case, by adding about 2 wt % to about 10 wt % of such a lubricant to water, the kinetic friction coefficient can be controlled to a preferred range.

Furthermore, by adding a rust preventive, corrosion of the rare-earth alloy can be prevented. In particular, in cutting an R—Fe—B based rare-earth alloy, PH is preferably set somewhere between 8 and 11. Examples of rust preventives include organic ones and inorganic ones. Preferred organic rust preventives include carboxylates such as oleates and benzoates and amines such as triethanolamine. Preferred inorganic rust preventives include phosphates, borates, molybdates, tungstates and carbonates.

Also, a nitrogen compound such as benztriazol may be used as a nonferrous metal anticorrosive agent. A formaldehyde donor such as hexahydrotriazine may be used as a preservative.

A silicone emulsion may be used as an antifoaming agent. By adding the antifoaming agent, foaming of the coolant can be reduced, the permeability and cooling effect of the coolant can be improved, and the abnormal temperature rise or abnormal abrasion of the wire 20 can be minimized.

Figure 4:
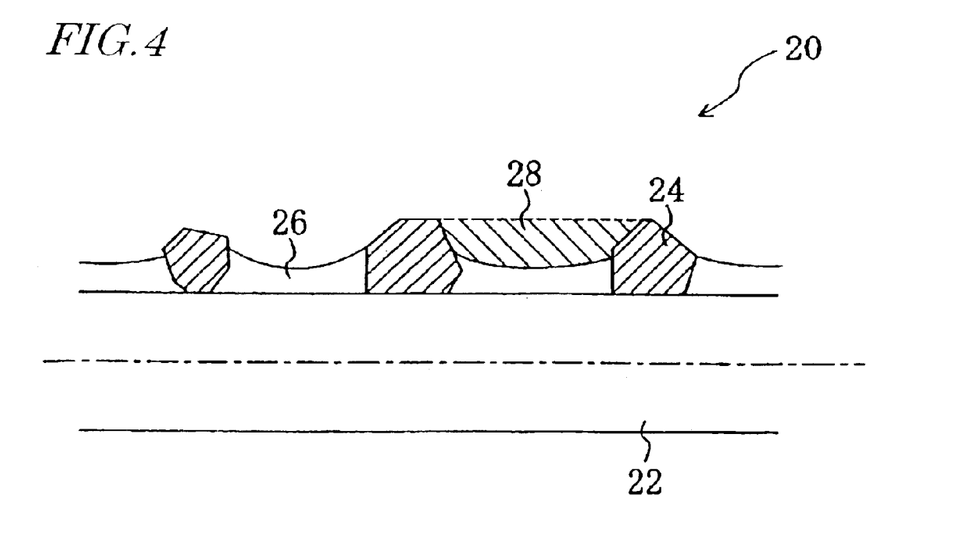
FIG. 4 schematically illustrates a cross-sectional structure for the wire 20 that can be used effectively to carry out the cutting method of the preferred embodiment of the present invention.

Next, the structure of the wire 20 to be preferably used in this preferred embodiment will be described with reference to FIG. 4. It should be noted that the structure of the lower half of the wire 20 below the one-dot chain is simplified in FIG. 4.

A wire, obtained by fixing diamond abrasive grains 24 on the outer surface of a core wire (e.g., a piano wire) 22 with a resin layer 26, is preferably used as the wire 20. Among other things, a phenol resin, an epoxy resin and a polyimide resin are particularly preferred. This is because these resins show not only high bond strengths with respect to the outer surface of the piano wire (i.e., hard-drawn wire) 22 but also excellent wettability (i.e., permeability) with respect to the coolant described above. The abrasive grains do not have to be diamond abrasive grains but may also be SiC, for example.

More specifically, a preferred wire 20 having an outside diameter of about 0.24 mm may be obtained by fixing diamond abrasive grains, having a mean particle size of about 45 μm, on the outer surface of a piano wire 22, having a diameter of about 0.18 mm, with a phenol resin layer 26. Also, considering the cutting efficiency and the cutting debris (sludge) flushing efficiency, the average distance between two adjacent abrasive grains 24 in the traveling direction of the wire 20 (i.e., the axial direction that is parallel to the one-dot chain in FIG. 4) is preferably 100% to 600% of the mean particle size D of the abrasive grains. Also, the average height of the portions of the abrasive grains 22 protruding from the surface of the phenol resin layer 26 is preferably within the range of 10 μm to 40 μm. Such a wire 20 has a space 28 of an adequate dimension (which is sometimes called a "chip pocket") between the abrasive grains 22, thus achieving good cutting efficiency and good flushing capability.

The present inventors carried out an experiment to find how effectively the neodymium magnet alloy could be cut with this wire saw machine 100 when a wire produced by Allied Material Corp. and satisfying the specifications described above was used as the wire. While the reel bobbins were sprayed with a coolant (e.g., a 10% aqueous solution (with a temperature of 23° C.) of #830 produced by Yushiro Chemical Industry Co., Ltd.) at a feed rate of 200 ml/min, the workpieces were cut with the wire traveling bidirectionally at a maximum traveling velocity of 1,100 ml/min, a tension of 30 N, a cutting rate of 40 mm/hr and a new wire feed rate of 2 m/min. As a result, compared to the situation where the reel bobbins 40a and 40b (with a wire length of 38 km) were sprayed with no coolant, the amount of the abrasive grains dropped or the resin layer peeled off decreased to about one-third. Similar results were obtained when a coolant with a kinetic friction coefficient of 0.11 to 0.13, a surface tension of 33 mN/m to 36 mN/m and a viscosity of 1 mPa·s to 4 mPa·s (with a kinematic viscosity of 1 mm2/s to 4 mm2/s), obtained by adjusting the concentration of the #830 produced by Yushiro Chemical Industry Co., Ltd., was used.

The present inventors also confirmed that when the surface of the wire was coated with a glycol before the coolant was sprayed thereto, peeling of the resin could be reduced significantly. The wire surface was coated with the glycol in the following manner.

Specifically, while the wire (with an outside diameter of 0.24 mm) was being reeled in the reel bobbin at a reeling tension of about 10 N and a reeling pitch of about 0.46 mm, the wire surface was coated with a glycol (e.g., a polyoxyalkylene solution) by using a cloth permeated with the glycol.

By using such a glycol-coated wire, the probability of occurrence of resin peeling could be reduced from approximately 20% (i.e., 382/1,900) in the situation where a non-glycol-coated wire was used to approximately 2% (i.e., 3/237). The same conditions as those specified above were adopted except that the new wire feed rate was set to 3 m/min. The present inventors also confirmed that when the surface of the wire was coated with a lubricant including the glycol, the variation in the probability of occurrence of resin peeling with the environment in which the wire was stored could be reduced effectively. In this case, the resin peeling was evaluated in the following manner. Specifically, if the resin of the wire (with a length of about 900 m) that had been used for cutting a neodymium magnet alloy for 5 hours under the conditions specified above peeled off 5 mm or more, then the wire was regarded as a defective one with a peeled resin.

A glycol shows so high hydrophilicity (or water holding ability) as to prevent the resin layer from absorbing water in the air. To achieve this effect of the glycol efficiently, the glycol is preferably supplied to the wire surface directly but may be diluted with water as well. In that case, an aqueous solution including the glycol at a concentration of 50 mass % or more is preferably used although the glycol concentration may vary with the application method. An aqueous solution is preferred in this case such that the expected function of the aqueous coolant is not affected even when the coolant and the glycol are mixed together. A glycol exhibits excellent solubility with respect to water and excellent lubricity. Accordingly, even if the glycol is mixed with the aqueous coolant, the coolant is never affected by the glycol badly.

In the preferred embodiment described above, a cutting process is carried out by using a wire, of which the surface is coated with a lubricant including a glycol, and spraying a coolant against reel bobbins. However, even if the process step of spraying the coolant to the reel bobbins is omitted, the resin peeling can also be minimized effectively by coating the wire with the glycol in advance. Naturally, the glycol coating and the coolant spraying are most preferably adopted at the same time.

Next, a preferred structure for the main rollers 10a, 10b and 10c of the wire saw machine 100 of the first preferred embodiment will be described.

Figure 5:
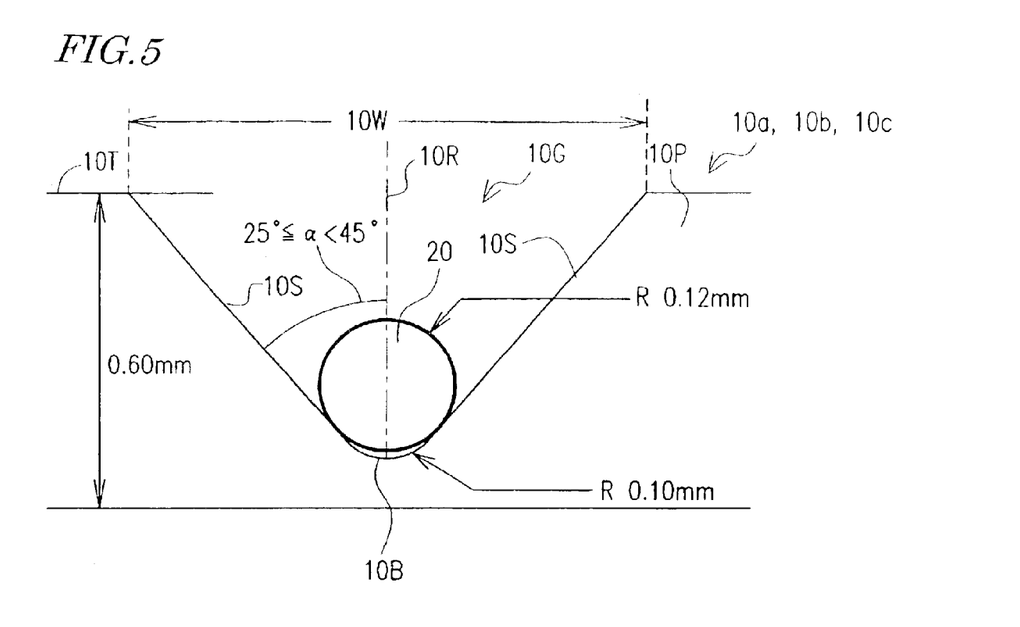
FIG. 5 schematically illustrates a cross-sectional structure for rollers that are preferably used in the wire saw machines 100 and 200.

If a coolant mainly composed of water is used, the wire snapping rate increases (i.e., the wire snaps in a shorter time) and the machining accuracy decreases as compared with a situation where an oil coolant is used. As a result of various experiments, the present inventors discovered that if the cross-sectional shape of the guide groove 10G provided on the polymer layer 10P of the rollers 10a, 10b and 10c is designed such that the pair of sloped surfaces 10S of the guide groove 10G defines an angle of 25 degrees to less than 45 degrees (which will be referred to herein as a "tilt angle α") with respect to the radial direction 10R of the roller 10a as schematically shown in FIG. 5, the snapping of the wire 20 can be minimized and sufficient machining accuracy is achieved. More preferably, the tilt angle is 30 degrees to 35 degrees.

Both of the two sloped surfaces 10S of the guide groove 10G preferably define the tilt angle falling within that range with respect to the radial direction R of the roller 10a as shown in FIG. 5. However, if at least one of the two sloped surfaces 10S has a tilt angle falling within that range, then the wire snapping can be minimized effectively and sufficient machining accuracy is achieved.

Figure 6:
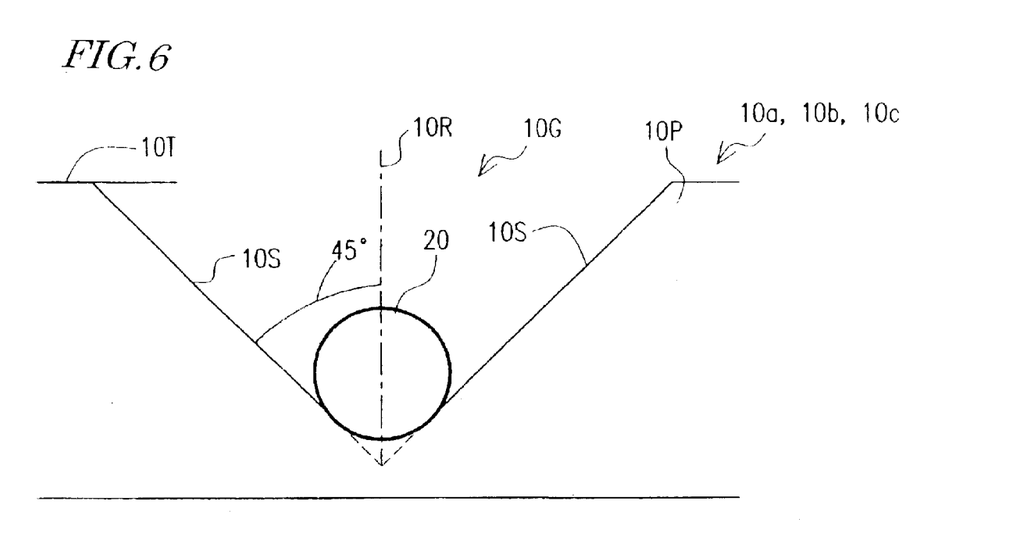
FIG. 6 schematically illustrates a cross-sectional structure for a conventional roller.

In the prior art, a structure in which the sloped surface 10S of the guide groove 10G defines a tilt angle of 45 degrees or more with respect to the radial direction R of the roller is adopted as shown in FIG. 6, for example. Such a structure is adopted to remove the sludge sufficiently efficiently from the guide groove 10G. Among other things, a rare-earth alloy includes a main phase causing a brittle fracture and a grain boundary phase causing a ductile fracture, thus producing high cutting resistance. In addition, the rare-earth alloy has so heavy a specific gravity that it is not easy to remove a sludge including the rare-earth alloy. For that reason, to remove the sludge more efficiently, the tilt angle is set greater than 45 degrees.

However, the present inventors discovered and confirmed via experiments that even if the tilt angle of the sloped surface 10S was set greater than 45 degrees, the wire snapping rate did not decrease so much but rather the machining accuracy decreased. Hereinafter, this phenomenon will be described with reference to FIG. 7.

Figure 7:
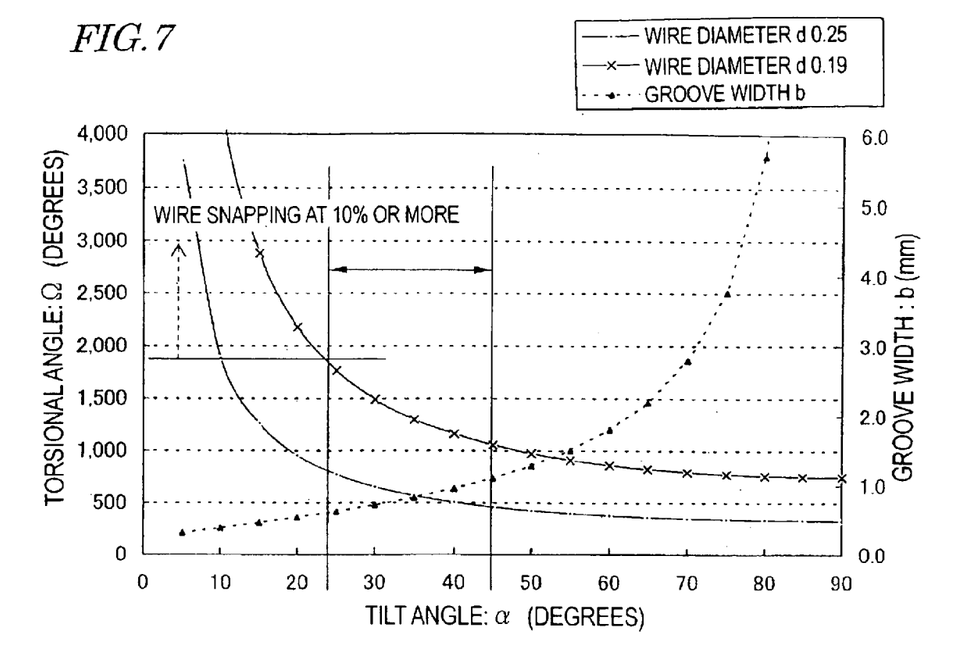
FIG. 7 is a graph showing relationships between the tilt angle of the slope 10S of the roller guide groove and the wire torsional angle.

FIG. 7 is a graph showing a relationship between the tilt angle of the sloped surface 10S of the roller guide groove and the wire torsional angle. The torsional angle $1\theta 6$ is proportional to the torsional force applied from the roller to the wire 20. When the torsional angle Ω is 360 degrees, it is shown that the wire has been subjected to one full torsion. It should be noted that the results shown in FIG. 7 were obtained by performing dynamical model calculations on the configuration to be described below. Also, the results shown in FIG. 7 were obtained on the supposition that the tilt angles of the two sloped surfaces 10S were equal to each other.

200 lines of the wire 20 were run at a tension of 30 N (i.e., 3 kgf) between the pair of rollers (e.g., the rollers 10b and 10d shown in FIG. 1) having a diameter of 170 mm, which were arranged at a span of 450 mm. The wire 20 was allowed to travel back and forth in a cycle time of 120 seconds and at a new wire feed rate of 2 m/min. In that case, after the wire 20 had made 190 rounds, the wire got out of the roller.

As a result of various experiments, it was discovered that when the wire was subjected to such torsional force that 5 full torsions (i.e., Ω=1,800 degrees) occurred during one span (450 mm), the wire 20 made about 500 torsions while traveling through the 200 lines. That is to say, if the wire was subjected to torsional force that caused 1,000 torsions (=200 lines×5 fives), approximately 50% of the torsions were accumulated as actual torsions. Thus, the torsional angle Ω as the ordinate of FIG. 7 was obtained by multiplying a torsional angle, corresponding to torsional force estimated by the dynamical model calculations, by 0.5. Furthermore, based on the results of a static torsional fracture strength test, it was estimated that when the torsional angle actually accumulated in the wire 20 reached 1,800 degrees (i.e., 5 full torsions), the wire should cause a fracture at a probability of 10%.

As can be seen from FIG. 7, as the tilt angle α of the groove 10G increases, the torsional force (or torsional angle) decreases monotonically. Suppose the wire 20 causes a fracture simply due to the torsional force. In that case, if the wire 20 is relatively thin (e.g., has a diameter d of 0.19 mm), then the fracture of the wire 20 can be avoided by setting the tilt angle equal to or greater than 10 degrees. Also, even if the wire 20 is relatively thick (e.g., has a diameter d of 0.25 mm), the fracture of the wire 20 can be avoided by setting the tilt angle equal to or greater than 25 degrees.

According to the results of experiments, however, no matter whether the wire 20 was relatively thin or thick, the wire snapping percentage did not decrease so much once the tilt angle exceeded 45 degrees. Also, if the tilt angle was 45 degrees or more, the machining accuracy decreased unintentionally.

The reasons are believed to be as follows. Specifically, as the tilt angle increases, the width 10W of the guide groove 10G (see FIG. 5) increases, thereby allowing the wire 20 to swing within the guide groove 10G or even jump to an adjacent guide groove 10G. Then, the tension or torsional force applied to the wire 20 becomes non-uniform to produce significant stress locally. As a result, the wire 20 snaps. Also, the machining accuracy decreases because the wire 20 could not travel along the groove 10G constantly. The experiments were carried out by using a urethane rubber layer as the polymer layer 10P and an approximately 10% aqueous solution of #830 produced by Yushiro Chemical Industry Co., Ltd. as the coolant. Also, rare-earth sintered magnet workpieces were cut as in the first preferred embodiment.

Considering these results, the sloped surfaces 10S of the guide groove 10G preferably have a tilt angle of 25 degrees to less than 45 degrees. Also, to minimize the snapping of the wire 20, the tilt angle is preferably 30 degrees or more such that the torsional force decreases. To achieve high machining accuracy, the tilt angle is preferably 35 degrees or less. Furthermore, the bottom 10B of the guide groove 10G is preferably shaped so as to have a somewhat smaller radius of curvature than the radius of the wire 20.

The results described above were obtained when the wire 20 had a tension of 20 N. However, similar results can be obtained if the wire has a tension of 20 N to 35 N.

Preferred embodiments of the present invention have been described as being applied to the wire saw machines 100 and 200. However, the present invention is in no way limited to those specific preferred embodiments. Alternatively, the present invention is also applicable for use in an endless wire saw machine using a single reel bobbin (see Japanese Laid-Open Publication No. 11-198018, for example).

According to various preferred embodiments of the present invention described above, a coolant mainly composed of water is used in a wire saw machine, thereby extending the life of a wire being used to cut a rare-earth alloy. A rare-earth alloy includes a hard main phase causing a brittle fracture and a grain boundary phase causing a ductile fracture, and therefore, is extremely difficult to cut with a wire saw. Thus, the present invention is particularly effectively applicable to cutting a rare-earth alloy. Furthermore, by adopting a cutting method according to a preferred embodiment of the present invention, the life of the wire can be extended not only when such a rare-earth alloy is cut but also when a hard and brittle material such as silicon, sapphire, quartz, glass, neodymium or ferrite is cut with a coolant mainly composed of water.

As described above, according to the present invention, in a situation where a workpiece is cut with a wire saw machine using a coolant that is mainly composed of water, the life of the wire can be extended.

The cutting method of the present invention makes it possible to cut a rare-earth alloy or any other hard and brittle material with high machining accuracy and with reduced machining allowance by using a coolant that is mainly composed of water. Accordingly, the yield of the material increases. In addition, since the coolant used is mainly composed of water, the coolant is environmentally friendly, the post-cutting cleaning process can be simplified, and the waste can be disposed of at a reduced cost.

The cutting method of the present invention achieves significant effects particularly when applied to cutting a rare-earth alloy, which is even harder to machine than a hard and brittle material such as silicon. The rare-earth alloy is an expensive material. Accordingly, a huge margin is obtained if the yield of this material can be increased. Also, the cutting debris can be easily sorted out of the waste and the coolant can be easily recycled. As a result, the waste is environmentally friendly and can be disposed of at a reduced cost. Consequently, the machining cost of the rare-earth alloy can be cut down. Thus, machined products such as a voice coil motor for a magnetic head can be manufacture at a low cost.

We claim:

1. A method of cutting a workpiece with a wire, the method comprising the steps of:

providing a wire, on which abrasive grains are fixed with a resin layer provided on the outer surface of a core wire, of which the surface is coated with a lubricant including a glycol, by reeling the wire up in a reel bobbin;

reeling the wire off the reel bobbin and letting the wire travel on a plurality of rollers; and cutting the workpiece with the traveling wire while a portion of the workpiece being machined with the wire is supplied with a first coolant which is mainly composed of water.

2. The cutting method of claim 1, further comprising the step of supplying a second coolant, which is also mainly composed of water, to the wire that is either reeled up in the reel bobbin or traveling in the vicinity of the reel bobbin.

3. The cutting method of claim 2, wherein the second coolant exhibits a kinetic friction coefficient of 0.3 or less at 25° C. with respect to a rare-earth alloy.

4. The cutting method of claim 2, wherein the second coolant includes glycol.

5. The cutting method of claim 2, wherein the second coolant is supplied to the wire by an atomization method.

6. The cutting method of claim 1, wherein the providing step includes reeling the wire up in the reel bobbin with a tension of 7 N to 15 N.

7. The cutting method of claim 1, wherein the wire is reeled up in the reel bobbin at a pitch that is less than twice as long as the outside diameter of the wire.

8. The cutting method of claim 1, wherein the first coolant exhibits a kinetic friction coefficient of 0.1 to 0.3 at 25° C. with respect to the rare-earth alloy.

9. The cutting method of claim 1, wherein the resin is a phenol resin, an epoxy resin or a polyimide resin.

10. The cutting method of claim 1, wherein in a direction in which the wire is traveling, an average distance between adjacent ones of the abrasive grains falls within the range of 100% through 600% of the mean particle size of the abrasive grains, and portions of the abrasive grains protruding from the surface of the resin layer have an average height of 10 μm to 40 μm.

11. The cutting method of claim 1, wherein the second coolant has higher viscosity than the first coolant.

12. The cutting method of claim 1, wherein the first and second coolants have temperatures of 15° C. to 35° C.

13. The cutting method of claim 1, wherein each of the plurality of rollers includes a polymer layer on which a guide groove is provided, the guide groove has a pair of sloped surfaces, at least one of which defines an angle of 25 degrees to less than 45 degrees with respect to a radial direction of the roller, and the wire is passed between the sloped surfaces.

14. The cutting method of claim 1, wherein the workpiece is made of an R—Fe—B based rare-earth sintered alloy.

15. The cutting method of claim 14, wherein the workpiece is made of an Nd—Fe—B based rare-earth sintered alloy.

16. A method for producing rare-earth magnets, the method comprising the steps of:
   making a sintered body for the rare-earth magnets from a rare-earth alloy powder; and
   dividing the sintered body by the cutting method of claim 1 into a plurality of rare-earth magnets.

* * * * *

UNITED STATES PATENT AND TRADEMARK OFFICE
CERTIFICATE OF CORRECTION

PATENT NO.    : 6,945,242 B2                                          Page 1 of 1
DATED         : September 20, 2005
INVENTOR(S)   : Kondo et al.

It is certified that error appears in the above-identified patent and that said Letters Patent is hereby corrected as shown below:

<u>Title page,</u>
Item [30], Foreign Application Priority Data, "2001-3118867" should read
-- 2001-318867 --.

Signed and Sealed this

Twenty-ninth Day of November, 2005

JON W. DUDAS
*Director of the United States Patent and Trademark Office*